UNITED STATES PATENT OFFICE.

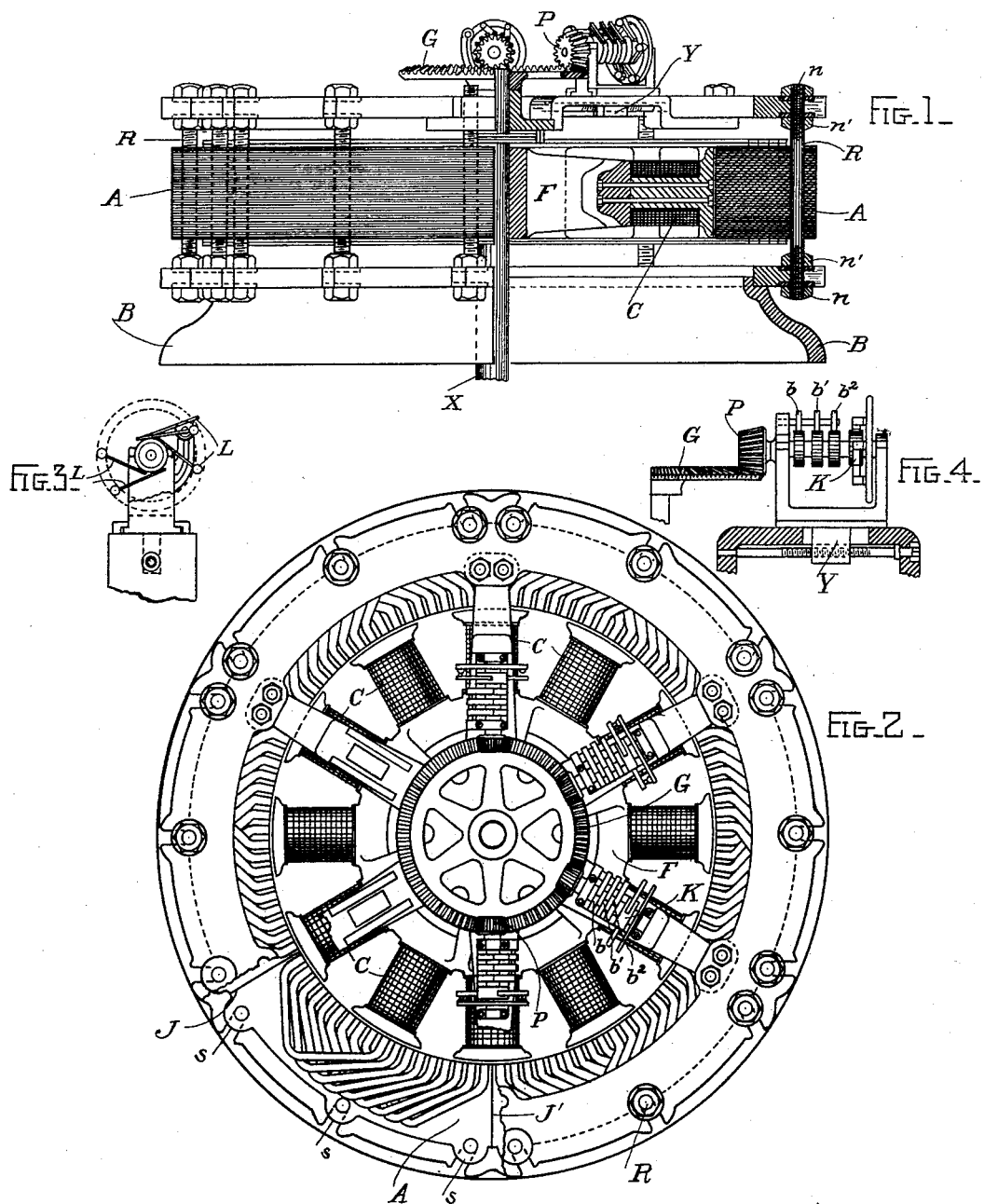

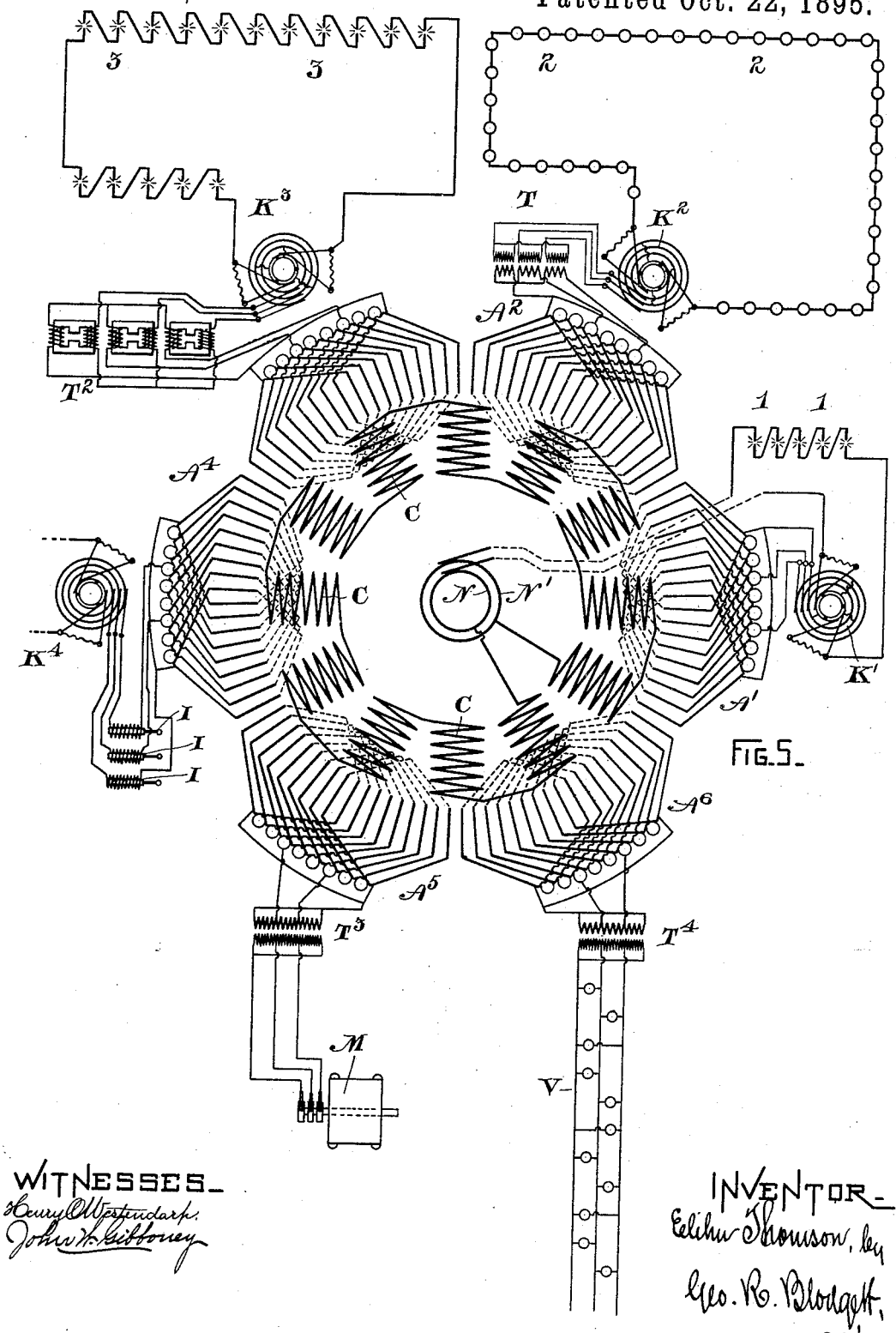

ELIHU THOMSON, OF SWAMPSCOTT, MASSACHUSETTS, ASSIGNOR TO THE GENERAL ELECTRIC COMPANY, OF NEW YORK.

DYNAMO-ELECTRIC MACHINE.

SPECIFICATION forming part of Letters Patent No. 548,406, dated October 22, 1895.

Application filed March 29, 1895. Serial No. 543,745. (No model.)

*To all whom it may concern:*

Be it known that I, ELIHU THOMSON, a citizen of the United States, residing at Swampscott, in the county of Essex, State of Massachusetts, have invented certain new and useful Improvements in Dynamo-Electric Machines, of which the following is a specification.

My invention relates to dynamo-electric machines, and has for its object to provide a machine of the multipolar type directly connected for a number or series of arc-light circuits, in which I may maintain the simplicity of commutation and possibility of regulation for each of the separate circuits as it exists in the ordinary arc-lighting machines. The object of the machine is primarily to allow of direct driving for arc lights. It is, therefore, made a multicircuit-machine, in each of the circuits of which a series of arc lights may be run with continuous currents, if desired. Briefly, the machine consists of a revolving set of field-magnets on a water-wheel or steam-engine shaft, the field-magnets being multipolar and the number of poles being chosen with respect to the speed and rate of cutting of the lines desired. The armature is stationary and is provided with circuits non-overlapping, constituting groups of three coils or three-phase windings, from which three terminals are carried out. This winding is supported on a laminated structure, divided into sections, so that any section may be removed with its winding for repairs without disturbing the integrity of the rest of the structure, which may even be run with one or more sections removed.

In order to commute the currents, commutators are driven synchronously with the machine or at higher rates. This can be done by synchronous motors driven by the machine carrying the commutators and fed by one of the three-phase circuits of the machine, or it can be done by direct gearing, which is the arrangement shown in the figures. The machine-shaft carries a large gear which engages with small pinions on each of the commutator-shafts, the commutators being revolved at a speed relatively greater than that of the main machine in the proportion of half the number of poles in the main machine—that is, the commutator is virtually bipolar, or if the commutator has four poles its speed would be one-half as great. If the field-poles of the main machine are twelve in number, the commutator would revolve six times as fast (if bipolar) as the machine. The construction admits, also, of the use of the open-coil arrangement of generating-coils and of commutators such as are common on arc-machines, and which have certain advantages, particularly with respect to simplicity. Each of the commutators carries three rings for connection by brushes to the stationary armature-windings, and carries, also, a three-segment commutator with the ordinary arrangements of brushes, either controlled or not by a regulator.

Of course the style of commutator and connections of coils might be changed to any other, such as that used on the Brush machine, but this would require a variation of the winding. The arrangement is such that any commutator may be thrown out of action or even removed without stopping the machine, and devices can be inserted between the armature-windings and the commutator to modify the currents in case those currents do not have the requisite character for the operation of arc lights. Thus the currents of the machine may be made by the armature reaction, resistances, &c., to be of the nature of those supplied by arc-lighting machines, tending to a fall of potential on an increase of current, and thereby giving stability to the current on the circuit, or particular devices—such as reactive coils, constant-current transformers, &c.— may be inserted between the connections from the stationary windings and the commutating devices, and a transformation of potential up or down may be at the same time accomplished if transformers are employed. While the machine is thus primarily adapted to work a number of circuits of arc lights, it may be on occasion employed to operate three-phase motors or three-phase lighting-circuits, or may be used in various transformer combinations to operate two-phase or other polyphase systems.

The accompanying drawings show an embodiment of my invention, Figure 1 being a side elevation, partly in section; Fig. 2, a plan of a machine embodying the invention; Figs. 3 and 4, details of the commutating and regulating arrangements, and Fig. 5 a diagram of the circuits as I contemplate applying the machine.

In Fig. 1 B B is the base of a machine in which the shaft is vertical, as is most convenient when water-power is used. X is the shaft which carries the revolving field-magnet structure F in the shape of a wheel with projecting poles, the coils being marked C C, &c. They are twelve in number. (Shown in Fig. 2.) The poles of these field-magnets revolve near to a laminated armature structure A, made of sheet-iron, with projections preferably extending inward, and this structure, which is divided into sections, is sustained by vertical rods or bolts, as at R R, three rods or bolts being shown to each section. The construction is such that by running back the nuts, as at $n$ $n$ and $n'$ $n'$, circular washers may be separated from each other and allow the sections to slide out with the bolts through the slots $s$ $s$ $s$, &c., Fig. 2, while when the nuts $n'$ $n'$ are tightened up the washers under the nuts fall into counterbored holes and secure the whole structure firmly, so that there can be no sliding outward. This, of course, is a minor matter of construction, which could be modified in various ways. The particular armature-section in Fig. 2, which is indicated as removable, has been shown with the upper ring or frame cut away, exposing the joint between two sections, as at J J'. The coils are wound as a non-overlapping system, the separate portions of each section of which, however, do overlap.

Mounted on the shaft of the machine is a gear-wheel G, in this case shown as a bevel-gear, engaging with pinions P, a number of which may be used corresponding to the number of circuits on the armature. These pinions drive small accessory shafts, (shown separately in Figs. 3 and 4,) which carry collector-rings and commutators, all suitably insulated, of course, each ring being connected to a segment of the commutator. The brushes bearing on the rings are indicated at $b$ $b'$ $b^2$ and the commutator at K. Suitable standards support the shaft, and devices for adjusting and securing the parts in place are indicated at Y and are carried on the frame of the machine. The brushes L L on the commutator, Fig. 3, may be mounted, as usual, for adjustment, and may be provided with brush-shifting arrangements, such as are common in arc-lighting machines for regulating the current or adjusting the brushes to the proper non-sparking positions. Current is fed into the field-magnet system from any suitable source by the usual method of connecting the terminals of the coils to insulated rings on the shaft (shown only in Fig. 5) with brushes bearing on the rings.

Fig. 2 shows four of the commutating devices in place, but does not show the connections. Fig. 1 shows two of the commutating devices without connections.

In Fig. 5 a comprehensive view of the connections of the whole machine is given, it being understood that the connections are subject to modification. The windings on the armature, while shown as what are now known as "Delta" or closed-circuit windings, might be modified to be of the open-coil type or "Y" windings. If other than the three-coil winding or three-phase winding be employed, the connections and arrangements would be modified accordingly. The field-magnet coils are indicated at C C C, &c., and central rings N N' are shown with brushes bearing thereon for carrying current into the field-coils. These brushes are included in one of the circuits of arc lamps, as at 1 1, with the commutator K' for rectifying the currents. This commutator has its connections direct to the windings in which the curent is generated by the revolution of the field, but this could only be done when the "characteristic" of the machine was proper for the operation of an arc-lighting circuit. It is to be understood, however, that the series of lights 1 1 might be a series of incandescent lights or other resistances, in which case the dynamo need not be specially adapted to arc lighting. Where, however, the characteristic is proper for arc lighting, this arrangement of circuit might be repeated in the machine shown six times and six circuits of arc lights be operated independently of each other and the regulation of current needed when lights were extinguished or started into operation be accomplished by a regulation of the brushes around the commutators in the known ways, each circuit taking care of its own regulation.

As indicating other connections which might be employed with the machine, either for all the circuits or for any particular one or more of them, there is indicated a set of lights 2 2, which may be arc lamps when the characteristic of the machine is proper, or incandescent lights in series where it is not adapted to arc lights, the current being driven through a commutator $K^2$ and being transformed up from the armature-winding by a triplicate transformer T, the primary coils of which may be of low potential from the armature-winding $A^2$, while the secondaries raise such current to high potential and are insulated entirely from the armature-winding, the currents from the said secondaries being commutated to continuous currents for the line by the commutator $K^2$. At 3 3 a circuit is shown which may contain arc lights or other resistances. In case the dynamo characteristic is such as not to effectively operate arc lights the current may pass through a set of transformers $T^2$, which are constructed to give a proper characteristic to the current— that is, the transformers may be "leakage-transformers"—the tendency of the secondary currents of which, even where the primary currents are fed by constant potential from the machine, is to become of constant value, so that they may be called "constant-current" transformers, or transformers having a constant-current tendency. The secondary coils are connected as in a three-phase system and the terminals carried to the rings which take the currents to the commutator-segments of the commutating device $K^3$, and the primary connections of circuits are in like manner carried to the three-phase connections.

Where the machine characteristic is not quite right for the operation of the circuit, or where it is desirable to modify the wave of current sent to the circuit either in its form or electromotive force, I may interpose a set of reactive coils I I I between the armature-coil system $A^4$ and the commutating device $K^4$, and by making the reactive coils I I I adjustable in any way the desired action or reaction upon the circuit may be secured.

The armature-winding $A^5$ might be connected to run through a commutator, if desired, or the commutator may be removed and the connections made directly to the transformers $T^3$, or the connections may be made without transformation to the system of lights or motors, such as a three-phase motor M taking current from the winding $A^5$.

The regulation of the potential for the running of the motor-line may be secured by changing the relations of the turns in the primary and secondary of the transformer itself, or in other ways. Again, a lighting-circuit without commutation may be operated from any one or more of the windings, as $A^6$, where through transformation, as by a set of transformers $T^4$, incandescent lamps connected in parallel are supplied with a current of proper potential to operate them, the circuit being indicated at V. In this case the regulation for potential may be made by the well-known means of changing the relations of the turns in the transformers or in other ways.

If such a machine as has been described be running with a number of its circuits supplying arc lamps or arc-lamp circuits or series circuits with proper resistances and the regulating devices for the current are employed in connection with the commutation while other of its circuits are connected for motor or incandescent-lamp work in parallel, then the regulation of the field strength or current in the coils of the field-magnets C C C may be made to keep the potential of the lighting-circuits constant, while not greatly affecting the operation of the series circuits, provided the regulation is within a certain range.

It would be within the invention as contemplated to couple the coils on the armature, when doing constant-potential work in multiple, so as to diminish the armature reactance or to run with a lessened current density in the winding, while for arc work or constant-current work in series the coils would be coupled for the higher armature reaction or run with a much higher density of current in the winding.

What I claim as new, and desire to secure by Letters Patent of the United States, is—

1. A dynamo-electric machine having a stationary armature provided with independent windings overlapping in sets, the sets not overlapping each other, and separate circuits extending from each independent winding.

2. A dynamo-electric machine having a stationary external armature provided with sets of independent overlapping windings arranged in different positions around its periphery, the sets of windings not overlapping each other, and separate circuits extending from each independent winding.

3. A dynamo-electric machine having a stationary external armature divided into sections, each section provided with an independent winding overlapping upon itself but not overlapping any other section, separate circuits extending from the different windings, an internal revolving field-magnet, and a connection between the field-magnet windings and one of the independent circuits including a commutator.

4. A dynamo-electric machine having a stationary armature provided with independent sets of overlapping windings occupying different relative positions around its periphery, the sets of windings not overlapping each other, separate commutators connected to some of the windings, and means for driving the several commutators synchronously with the revolution of the machine.

5. A dynamo-electric machine having a stationary external armature composed of independently removable sections, each section carrying an independent overlapping winding not connected to any other section.

6. A dynamo-electric machine having a stationary external armature composed of separately removable sections, each section having an independent winding not overlapping any other section, and commutators driven synchronously with the machine and connected to the several windings.

7. A dynamo-electric machine having a stationary external armature provided with independent three phase windings, the windings overlapping in sets, but the sets not overlapping each other, and separate circuits extending from each independent winding.

8. A dynamo-electric machine having a stationary external armature provided with independent three phase windings overlapping in sets, the sets not overlapping, separate circuits extending from each independent winding, and collecting devices in the separate circuits, some of such collecting devices consisting of synchronous commutators.

9. A dynamo-electric machine having a stationary external armature, constructed with independently removable sections, each section carrying a three phase winding, the winding of the separate sections not overlapping, separate circuits extending from each independent winding, some of the circuits provided with synchronous commutators, an internal revolving field-magnet, and connections between one of the circuits carrying commuted currents and the field-magnet.

10. A dynamo-electric machine having a stationary external armature composed of independently removable sections, each section provided with an independent winding, synchronous commutators for some of the sections, separate circuits for each section, and means for regulating the current flow in the circuits.

In witness whereof I have hereunto set my hand this 26th day of March, 1895.

ELIHU THOMSON.

Witnesses:
JOHN W. GIBBONEY,
HENRY O. WESTENDALP.